United States Patent
Shinyashiki et al.

(10) Patent No.: US 8,323,824 B2
(45) Date of Patent: Dec. 4, 2012

(54) LAMINATE TYPE BATTERY AND BATTERY MODULE INCORPORATING THE LAMINATE TYPE BATTERY

(75) Inventors: Yoshitaka Shinyashiki, Kobe (JP); Atsuhiro Funahashi, Toyonaka (JP); Hitoshi Maeda, Kobe (JP); Masayuki Fujiwara, Kasai (JP)

(73) Assignee: SANYO Electric Co., Ltd., Moriguchi-shi, Osaka (JP)

( * ) Notice: Subject to any disclaimer, the term of this patent is extended or adjusted under 35 U.S.C. 154(b) by 762 days.

(21) Appl. No.: 12/409,999

(22) Filed: Mar. 24, 2009

(65) Prior Publication Data

US 2009/0246607 A1 Oct. 1, 2009

(30) Foreign Application Priority Data

Mar. 31, 2008 (JP) ................................. 2008-093664

(51) Int. Cl.
  *H01M 6/46* (2006.01)
(52) U.S. Cl. ........ 429/162; 429/153; 429/181; 429/184; 429/185
(58) Field of Classification Search .................. None
  See application file for complete search history.

(56) References Cited

U.S. PATENT DOCUMENTS

| | | | |
|---|---|---|---|
| 2004/0043289 A1* | 3/2004 | Shimamura et al. | 429/162 |
| 2007/0105010 A1* | 5/2007 | Cassidy | 429/90 |

FOREIGN PATENT DOCUMENTS

| | | | |
|---|---|---|---|
| JP | 11-086823 A | | 3/1999 |
| JP | 2007-066612 | * | 3/2007 |
| JP | 2007-066612 A | | 3/2007 |

* cited by examiner

*Primary Examiner* — Ula C Ruddock
*Assistant Examiner* — Tony Chuo
(74) *Attorney, Agent, or Firm* — Westerman, Hattori, Daniels & Adrian, LLP

(57) ABSTRACT

A laminate type battery includes a laminate battery case and an electrode assembly. The laminate battery case includes two laminate films each having a metal layer and plastic layers provided on both faces of the metal layer, and has a welded portion in which peripheral edges of the two laminate films are welded to each other. The electrode assembly is enclosed in the laminate battery case, and has a positive electrode plate, a negative electrode plate, and a separator disposed therebetween. An internal gas pressure sensing portion, in which the inner plastic layer of each of the laminate films is absent and the metal layers are in contact with each other so as to be in an electrically conductive state, is formed in a portion of the welded portion. A voltage detection hole, in which the outer plastic layer is absent and the metal layer is exposed, is formed in a surface of each of the two laminate films.

14 Claims, 11 Drawing Sheets

(1)

(2)

LAMINATE TYPE BATTERY AND BATTERY MODULE INCORPORATING THE LAMINATE TYPE BATTERY

BACKGROUND OF THE INVENTION

1. Field of the Invention

The present invention relates to laminate type batteries used for, for example, robots, electric vehicles, and backup power sources, and battery modules incorporating the laminate type batteries. More particularly, the invention relates to laminate type lithium ion batteries that can improve charge-discharge characteristics at high rate, and battery modules incorporating the laminate type lithium ion batteries.

2. Description of Related Art

In recent years, batteries have been used for not only the power source of mobile information terminal devices such as mobile-phones, notebook computers, and PDAs but also for such applications as robots, electric vehicles, and backup power sources. This has led to a demand for higher capacity batteries. Because of their high energy density and high capacity, lithium ion batteries are widely utilized as the power sources for such applications as described above.

The battery configurations of lithium ion batteries are broadly grouped into two types: one in which a metal battery can in a cylindrical or prismatic shape is used as the battery case, and one in which a laminate film is used as the battery case.

A problem with the lithium-ion battery, particularly with the one using an organic electrolyte solution, has been an increase in the internal pressure that results from abnormal reactions. In view of the problem, the battery using a metal can as the battery case is provided with a gas release valve for releasing a gas to outside and cutting off the electric current when the internal gas pressure increases. On the other hand, the following batteries employing a laminate for the battery case have been proposed, for example. Japanese Published Unexamined Patent Application No. 11-86823 proposes a laminate type battery in which a portion with low proof pressure is provided at a portion of the sealing part so that gas can be released from the portion with low proof pressure when the internal pressure increases. Japanese Published Unexamined Patent Application No. 2007-66612 proposes a laminate type battery in which sealing is effected by a plurality of layers and a pressure sensing element such as pressure sensor or a strain sensor is provided between the plurality of layers so that an increase in the internal pressure can be detected when the sealing peels off.

However, the battery disclosed in Japanese Published Unexamined Patent Application No. 11-86823 has the problem that the release of the gas cannot be prevented in advance because the internal pressure increase cannot be detected before the release of the gas. The battery disclosed in Japanese Published Unexamined Patent Application No. 2007-66612 necessitates provision of a pressure sensor or a strain sensor in the battery, resulting in the problems of poorer battery productivity and higher costs.

BRIEF SUMMARY OF THE INVENTION

The present invention has been accomplished in view of the foregoing circumstances, and it is an object of the present invention to provide a laminate type battery capable of detecting an increase in the internal pressure before an internal gas is released outside without providing a pressure sensor or a strain sensor.

In order to accomplish the foregoing and other objects, the present invention provides a laminate type battery comprising: a laminate battery case comprising two laminate films each having a metal layer and plastic layers disposed on both faces of the metal layer, the laminate battery case having a welded portion in which peripheral edges of the two laminate films are welded to each other; an electrode assembly enclosed in the laminate battery case and comprising positive electrode plates, negative electrode plates, separators interposed between the positive electrode plates and the negative electrode plates, and positive and negative electrode current collector terminals being respectively connected to the positive and negative electrode plates and protruding from at least one side of the laminate battery case; an internal gas pressure sensing portion in which an inner plastic layer of each of the laminate films is absent and the metal layers are in contact with each other to be in an electrically conductive state, the internal gas pressure sensing portion provided at a portion of the welded portion; and a voltage detection hole in which an outer plastic layer is absent and the metal layer is exposed, the voltage detection hole formed in each surface of the two laminate films.

As described above, the metal layers are electrically connected to each other at a portion of the welded portion. Thus, when the sealing in this portion breaks apart due to an increase of the internal pressure, the voltage value or resistance value of the metal layers changes, whereby the breakage of the sealing can be detected. As a result, charging and discharging of the battery can be stopped. Moreover, it is unnecessary to provide a pressure sensor or a strain sensor in the battery. Therefore, productivity of the battery does not degrade, and cost increases do not occur.

It is preferable that an outer welded portion be provided between the peripheral edge and the internal gas pressure sensing portion in which the metal layers are electrically connected. This configuration makes it possible to detect an increase in the internal pressure before the outer welded portion breaks apart.

It is preferable that the outer welded portion have a proof pressure equal to or higher than that of the welded portion in which the metal layers are electrically connected. Such a configuration makes it possible to detect an increase in the internal pressure reliably before the outer welded portion breaks apart.

It is preferable that the internal gas pressure sensing portion be formed in a side of the welded portion from which the positive and negative electrode current collector terminals protrude, the welded portion formed over entire peripheral edges of the laminate films. Actually, the welded portion existing along the side from which the positive and negative electrode current collector terminals protrude tends to break apart easily because it has a slightly less proof pressure than that of the welded portion existing along the other sides. Accordingly, when the internal gas pressure sensing portion is formed in the welded portion that tends to break apart easily, an increase in the internal pressure can be detected reliably before the welded portion breaks apart.

It is preferable that the metal layer comprise aluminum, an inner plastic layer of each of the plastic layers comprise one of polypropylene, nylon, and polyethylene terephthalate; and an outer plastic layer of each of the plastic layers comprise one of polypropylene, nylon, and polyethylene terephthalate.

It is preferable that that a positive electrode active material of the positive electrode plates and a negative electrode active material of the negative electrode plates comprise a material capable of intercalating and deintercalating lithium. When the invention is applied to a lithium-ion battery in which the positive electrode active material and the negative electrode active material are made of a material capable of intercalating and deintercalating lithium, the capacity of the battery can be increased while improving the reliability of the battery.

The present invention also provides a battery module comprising: the foregoing laminate type battery; a protection circuit, for suppressing an increase of an internal pressure of the laminate type battery, comprising a charging device for charging the laminate type battery, a switching element coupled on a charging line for supplying electric power from the charging device to the battery, an internal pressure sensing device for detecting the internal pressure of the battery, and a control device for turning the switching element to an off state if the internal pressure reaches a predetermined value or higher based on a detection result of the internal pressure sensing device; and one connecting line and another connecting line for electrically connecting the internal pressure sensing device in the protection circuit and the laminate type battery to each other, wherein the one connecting line connects the internal pressure sensing device to an exposed portion of the metal layer within the voltage detection hole in one face of the laminate type battery, and the other connecting line connects the internal pressure sensing device to an exposed portion of the metal layer within the voltage detection hole in the other face of the laminate type battery.

The just-described configuration makes it possible to stop the charging and discharging reliably when the internal pressure increases, and therefore, battery safety improves.

It is preferable that in the battery module according to the invention, a plurality of the laminate type batteries be arrayed to form a battery pack, and that each of the laminate type batteries be connected to the internal pressure sensing device in the protection circuit by a predetermined connection configuration.

The predetermined connection configuration may be such that: the one connecting line and the other connecting line are provided for each one of the laminate type batteries; the exposed portions of the metal layers within the voltage detection holes, each of which being in one face of the respective one of the laminate type batteries, are connected to the one connecting lines corresponding to the laminate type batteries; and the exposed portions of the metal layers within the voltage detection holes, each of which being in the other face of the respective one of the laminate type batteries, are connected to the other connecting lines corresponding to the laminate type batteries; whereby each of the laminate type batteries is individually connected to the internal pressure sensing device in the protection circuit.

This configuration makes it possible to detect an increase in the internal pressure for each of the laminate type batteries.

The just-described connection configuration may be such that, in each of the laminate type batteries, both the voltage detection hole in the one face and the voltage detection hole in the other face are located in one same side of two opposing sides of the laminate type battery across the positive and negative electrode current collector terminals. This makes it possible to bring the connecting lines together to one corner.

The above-described connection configuration may be such that, in each of the laminate type batteries, the voltage detection hole in the one face is located in one side of two opposing sides of the laminate type battery across the positive and negative electrode current collector terminals, and the voltage detection hole in the other face is located in the other side of the two opposing sides of the laminate type battery across the positive and negative electrode current collector terminals.

The just-described connection configuration may be such that: the exposed portions of the metal layers within the voltage detection holes each of which being in one face of the respective one of the laminate type batteries are connected serially; the exposed portion of the metal layer within the voltage detection hole in one face of a laminate type battery in the rearmost row is connected to the one connecting line; the exposed portions of the metal layers within the voltage detection holes each of which being in the other face of the respective one of the laminate type batteries are connected serially; and the exposed portion of the metal layer within the voltage detection hole in the other face of a laminate type battery in the frontmost row is connected to the other connecting line.

This configuration makes it possible to detect an increase in the internal pressure for all the laminate type batteries.

The just-described connection configuration may be such that, in each of the laminate type batteries, both the voltage detection hole in the one face and the voltage detection hole in the other face are located in one same side of two opposing sides of the laminate type battery across the positive and negative electrode current collector terminals. This makes it possible to bring the connecting lines together to one corner.

The above-described connection configuration may be such that, in each of the laminate type batteries, the voltage detection hole in the one face is located in one side of two opposing sides of the laminate type battery across the positive and negative electrode current collector terminals, and the voltage detection hole in the other face is located in the other side of the two opposing sides of the laminate type battery across the positive and negative electrode current collector terminals.

DETAILED DESCRIPTION OF THE INVENTION

Hereinbelow, a stack type battery (prismatic lithium ion battery) according to one embodiment of the present invention will be described with reference to FIGS. 1 through 12. It should be construed, however, that the stack type battery, which is one type of the laminate type battery, according to this invention is not limited to the following embodiments and examples but various changes and modifications are possible without departing from the scope of the invention.

EXAMPLES

Example 1

Structure of Stack Type Battery

Figure 1:
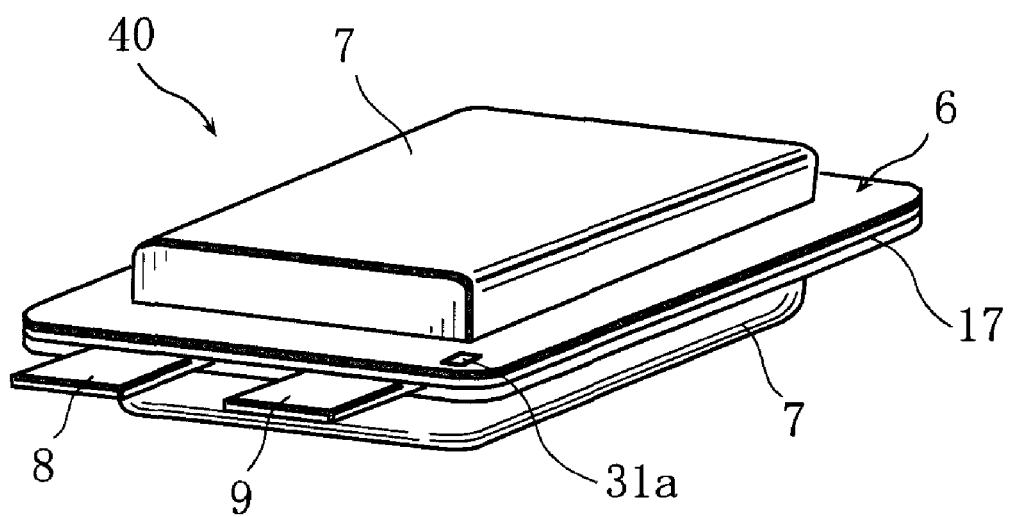
FIG. 1 is a perspective view illustrating a stack type battery according to the present invention.
Figure 2:
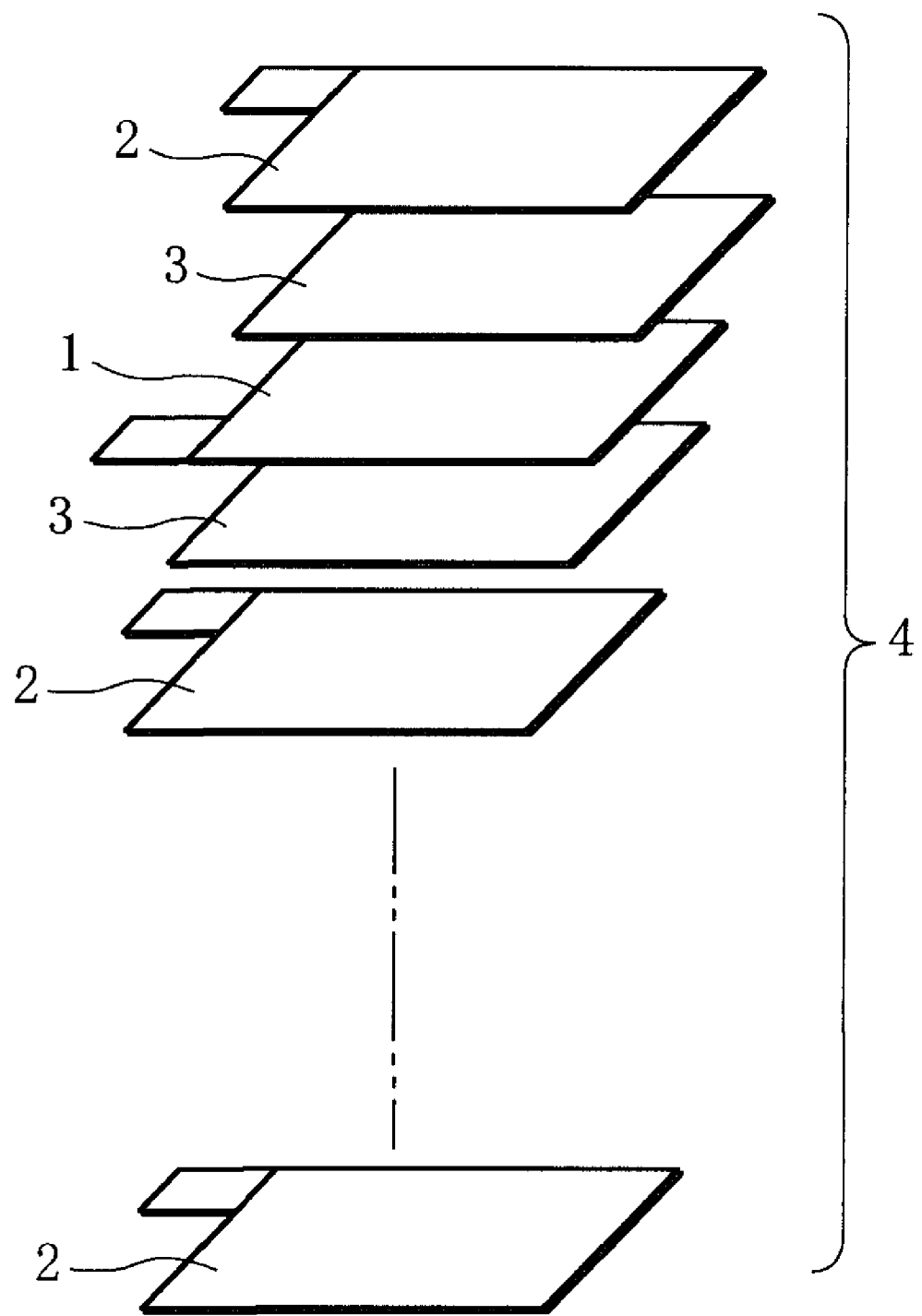
FIG. 2 is an exploded perspective view illustrating a stacked electrode assembly used for a stack type battery according to the present invention.
Figure 3:
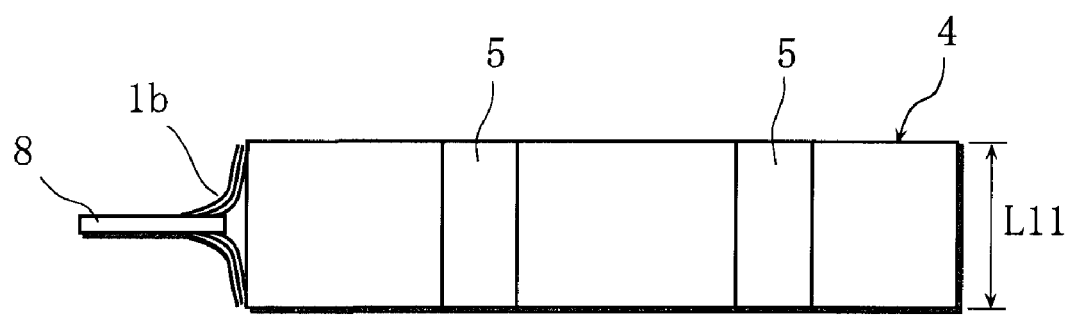
FIG. 3 is a side view illustrating the stacked electrode assembly used for the stack type battery according to the present invention.

As illustrated in FIG. 2, a stacked type battery 40 comprises a stacked electrode assembly 4. In the stacked electrode assembly 4, a multiplicity of positive electrode plates 1 and a multiplicity of negative electrode plates 2 are stacked on each other with a multiplicity of separators 3 interposed therebetween. The outermost stacks are constituted by negative electrode plates 2. Since the negative electrode plates 2 need to be placed at the outermost stacks, the stacked electrode assembly 10 is configured so that the number of the negative electrode plates 2 is greater by one than that of the positive electrode plates 1 (specifically, the stacked electrode assembly 10 contains 50 sheets of positive electrode plate 1 and 51 sheets of negative electrode plate 2). In addition, as illustrated in FIG. 3, tapes 5 for preventing misalignment of the electrode plates 1 and 2 are attached on the stacked electrode assembly 4 (the thickness L11 of the stacked electrode assembly immediately after manufacturing, in other words, before being enclosed in the accommodating space of the laminate battery case is 12 mm) so that they straddle over the stacked electrode assembly 4. The stacked electrode assembly 4 as well as an electrolyte solution is enclosed in an accommodating space within a laminate battery case 6, as shown in FIG. 1, formed by melt-bonding two sheets of laminate film 7. A positive electrode current collector terminal 8 made of an aluminum plate (thickness: 0.5 mm) and a negative electrode current collector terminal 9 made of a copper plate (thickness: 0.5 mm) protrude from the laminate battery case 6. The laminate film 7 has a structure in which plastic layers are formed on both faces of an aluminum foil. In FIG. 1, reference numeral 17 represents a welded portion in which the two sheets of laminate film 7 are welded to each other.

Figure 4:
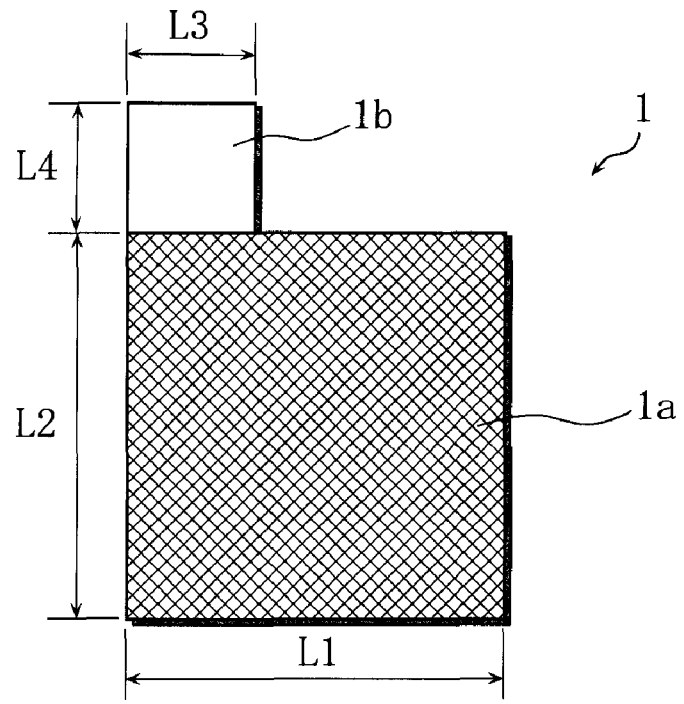
FIG. 4 is a plan view illustrating a positive electrode used for the stack type battery of the present invention.

As illustrated in FIG. 4, each of the positive electrode plates 1 has a positive electrode active material layer 1a disposed on both faces of a positive electrode conductive current collector made of a rectangular-shaped aluminum foil (thickness: 15 µm). The positive electrode active material layer 1a comprises a positive electrode active material made of $LiCoO_2$, a conductive agent made of carbon black, and a binder agent made of polyvinylidene fluoride. The positive electrode plate 1 has a width L1 of 95 mm and a height L2 of 95 mm. A positive electrode current collector tab 1b (width L3: 30 mm, height L4: 20 mm) protrudes from one side of the positive electrode plate 1. The positive electrode current collector tab 1b is formed integrally with the positive electrode conductive current collector and is not provided with the positive electrode active material layer 1a. The positive electrode current collector tabs 1b are welded to the positive electrode current collector terminal 8 by ultrasonic welding so that the positive electrode current collector tabs 1b are overlapped on observe and reverse faces of the positive electrode current collector terminal 8.

Figure 5:
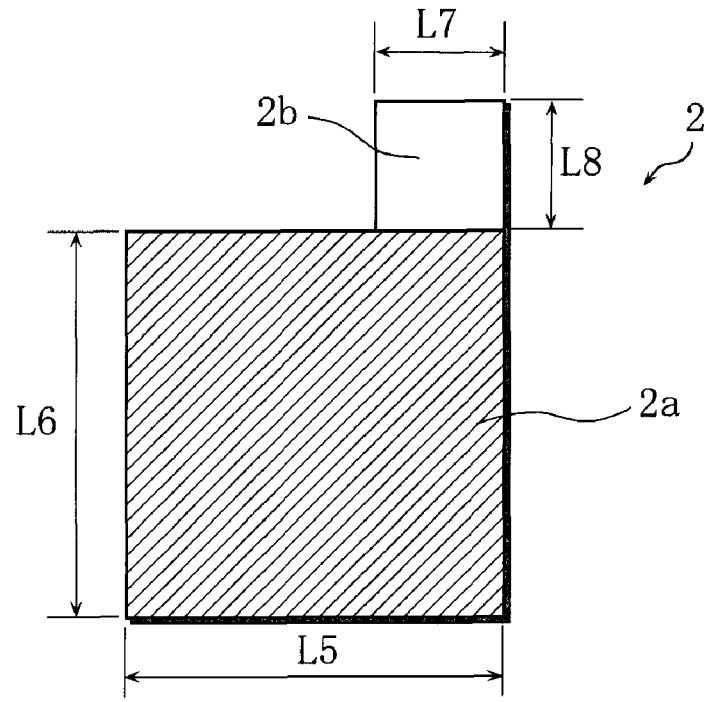
FIG. 5 is a plan view illustrating a negative electrode used for the stack type battery of the present invention.

As illustrated in FIG. 5, each of the negative electrode plates 2 has a negative electrode active material layer 2a disposed on both faces of a negative electrode conductive current collector made of a square-shaped copper foil (thickness: 10 µm). The negative electrode active material layer 2a comprises a negative electrode active material made of natural graphite and a binder agent made of polyvinylidene fluoride. The negative electrode plate 2 has a width L5 of 100 mm and a height L6 of 100 mm. A negative electrode current collector tab 2b (width L7: 30 mm, height L8: 20 mm) protrudes from one side of the negative electrode plate 2. The negative electrode current collector tab 2b is formed integrally with the negative electrode conductive current collector and is not provided with the negative electrode active material layer 2a. The negative electrode current collector tabs 2b are welded to the positive electrode current collector terminal 9 by ultrasonic welding so that the negative electrode current collector tabs 2b are overlapped on observe and reverse faces of the negative electrode current collector terminal 9.

Figure 6:
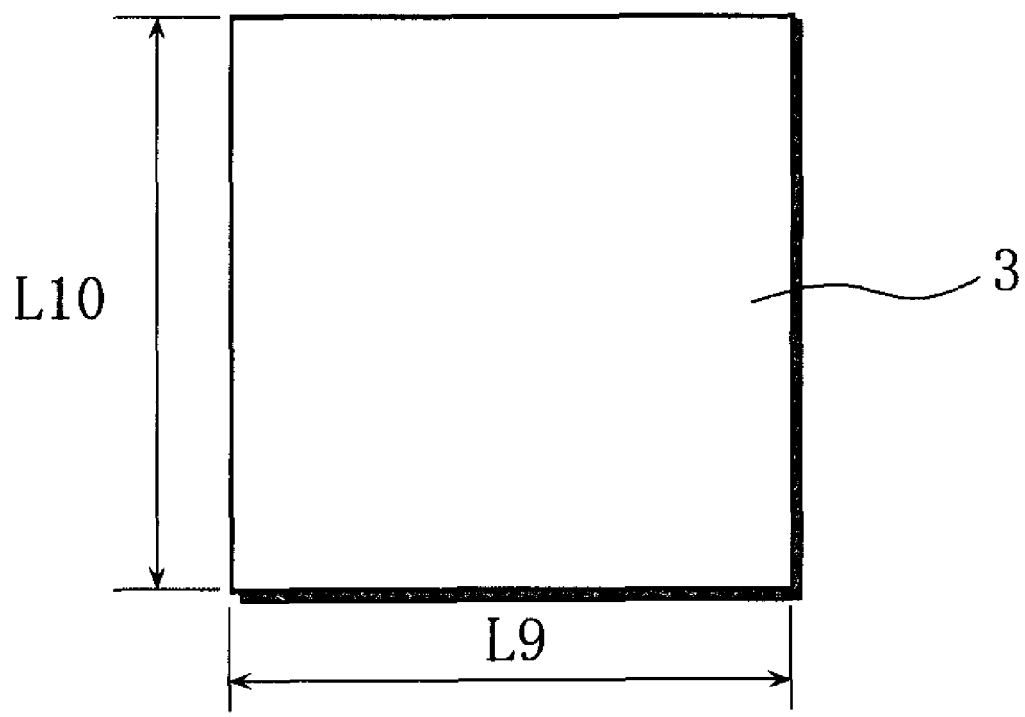
FIG. 6 is a plan view illustrating a separator used for the stack type battery of the present invention.

The separator 3 is made of polypropylene (PP) having a thickness of 30 µm and has a square shape with a width L9 of 100 mm and a height L10 of 100 mm, as illustrated in FIG. 6.

Figure 7:
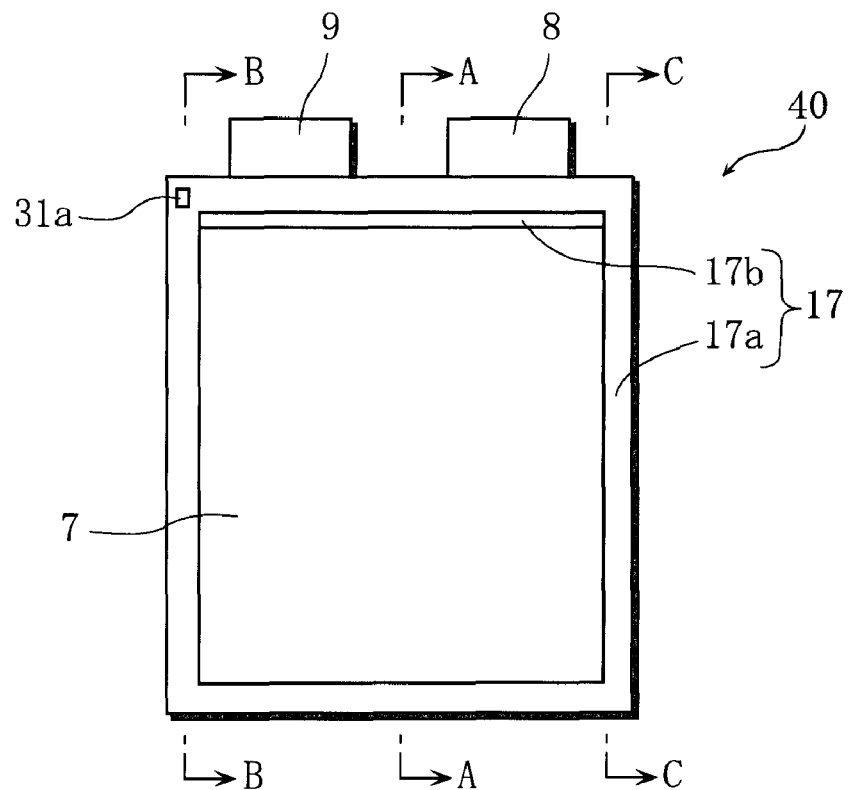
FIG. 7 is a plan view illustrating the stack type battery according to the present invention.
Figure 8:
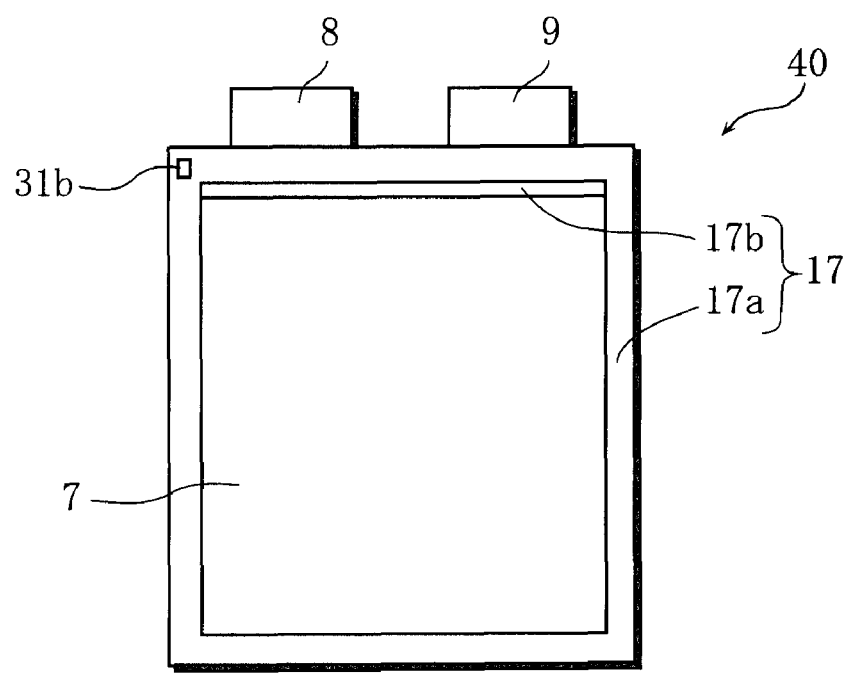
FIG. 8 is a bottom view illustrating the stack type battery according to the present invention.
Figure 9:
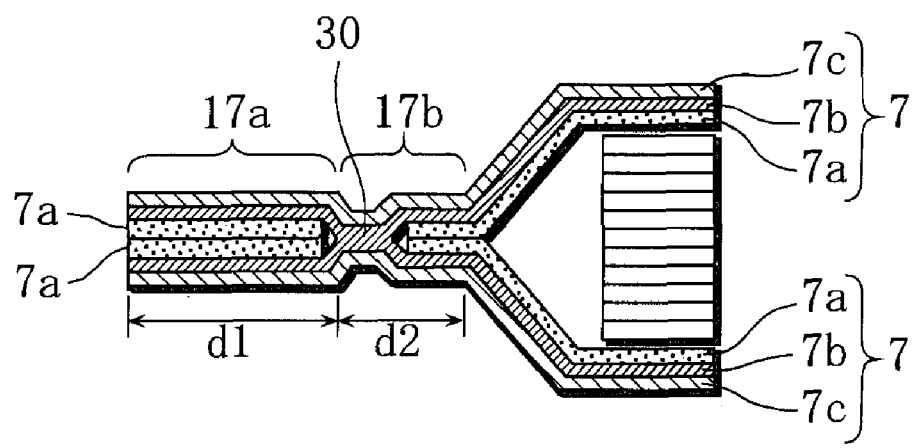
FIG. 9 shows cross-sectional views taken along line A-A in FIG. 7, wherein FIG. 9(1) illustrates the condition in which the inner weld portion has not broken apart, and FIG. 9(2) illustrates the condition in which the inner weld portion has broken apart.
Figure 9:
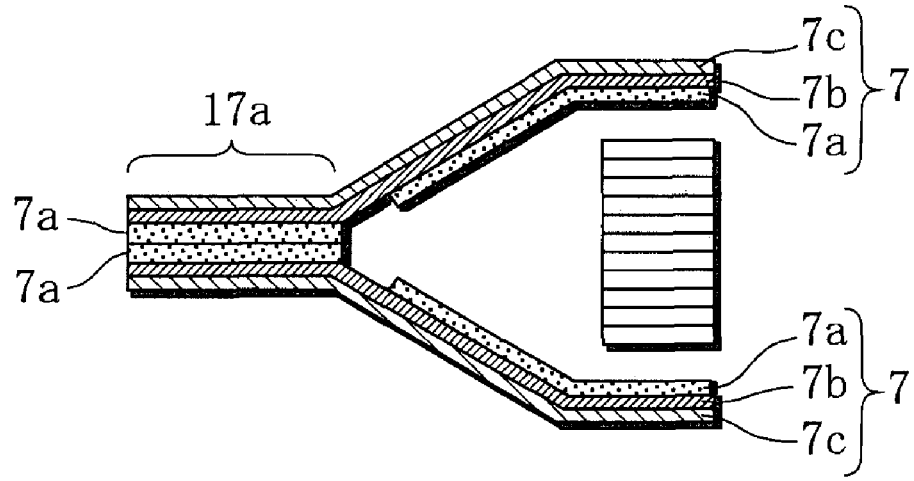
Figure 10:
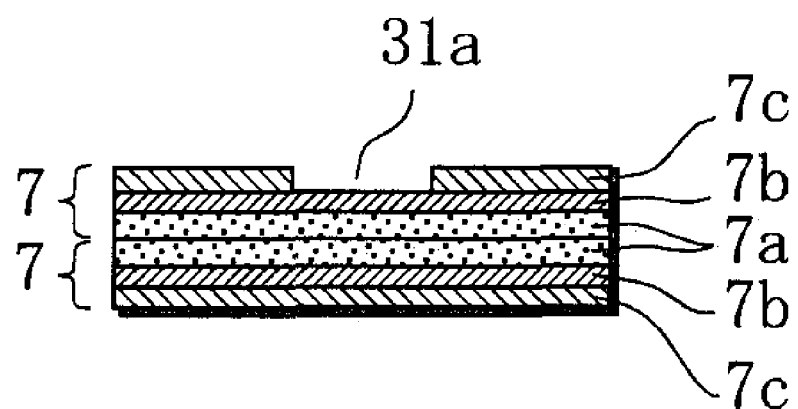
FIG. 10 is a cross-sectional view taken along line B-B in FIG. 7.
Figure 11:
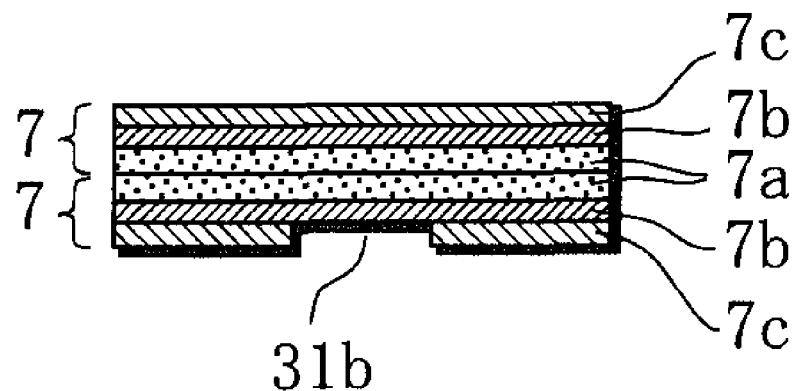
FIG. 11 is a cross-sectional view taken along line C-C in FIG. 7.

As illustrated in FIGS. 9 to 11, each of the laminate films 7, which constitute the laminate battery case 6, has a three-layer structure comprising an inner plastic layer 7a (thickness: 50 µm) made of polypropylene (PP), a metal layer 7b (thickness: 40 µm) made of aluminum foil, and an outer plastic layer 7c (thickness: 20 µm) made of nylon. As illustrated in FIGS. 7 to 9, the welded portion 17, in which the peripheral edges of the two laminate films 7 are welded to each other, comprises a square-frame-shaped outer welded portion 17a (width d1: 10 mm), which is formed along the four sides of the laminate films 7, and an inner welded portion 17b (width d2: 5 mm), which is formed inward of a side of the outer welded portion 17a in which the terminals 8 and 9 exist. The proof pressure of the outer welded portion 17a is set to be equal to or higher than the proof pressure of the inner welded portion 17b. Specifically, the proof pressure of the inner welded portion 17b is set to be from 1.5 kgf/cm² to an outer set value, and the proof pressure of the outer welded portion 17a is set to be from an inner set value to 5 kgf/cm². The reason why the lower limit value is set at 1.5 kgf/cm² and the upper limit value is set at 5 kgf/cm² is as follows. If the lower limit value is too low, even the internal pressure increase that occurs during normal charge-discharge operations and that originating from normal temperature changes are detected. On the other hand, if the upper limit value is too high, adverse effects tend to be more serious at the time when an abnormality occurs.

In addition, an internal gas pressure sensing portion 30, in which the inner plastic layer 7a is absent and the metal layers 7b are in contact with each other so as to be in an electrically conductive state, is formed in the inner welded portion 17b, as illustrated in FIG. 9(1). Since this internal gas pressure sensing portion 30 is provided, a change occurs in the voltage value or the resistance value between the two metal layers 7b when the inner welded portion 17b breaks apart due to an internal pressure increase, as illustrated in FIG. 9(2). As a result, it becomes possible to detect the internal pressure increase.

Figure 12:
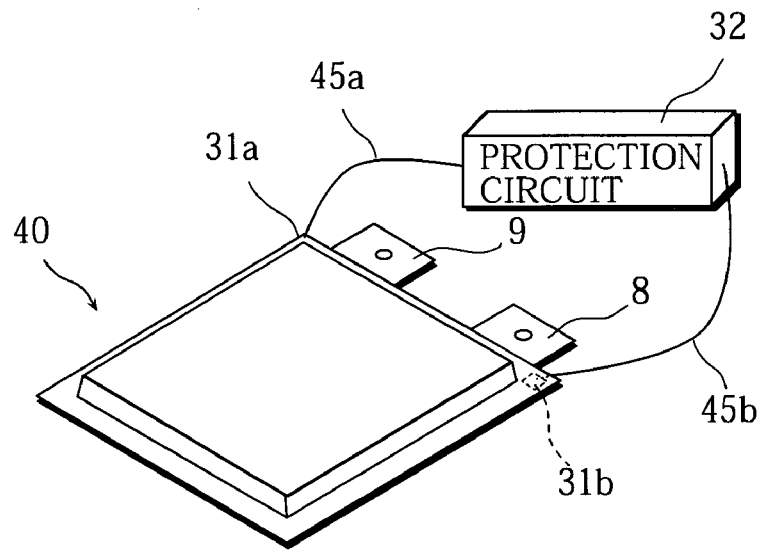
FIG. 12 is a perspective view illustrating a battery module incorporating the stack type batteries and a protection circuit according to the present invention.

In addition, a voltage detection hole 31a, in which the outer plastic layer 7c is absent and the metal layer 7b is exposed, is formed in one of the surfaces of the welded portion 17, as illustrated in FIGS. 7 and 10, and a voltage detection hole 31b, in which the outer plastic layer 7c is absent and the metal layer 7b is exposed, is also formed in the other surface of the welded portion 17, as illustrated in FIGS. 8 and 11. In the present example, the voltage detection holes 31a and 31b are provided respectively on the both surfaces of the welded portion 17. However, the present invention is not limited to this configuration, and it is possible to detect the voltage even when a voltage detection hole is provided in a location other than the welded portion 17. A protection circuit 32 as shown in FIG. 12 is connected to the exposed portions of the metal layers 7b in the voltage detection holes 31a and 31b in order to monitor a change in the voltage value or the resistance value between the two metal layers 7b so that charging of the stack type battery can be stopped at the time of an internal pressure increase. The specific configuration of the protection circuit 32 will be described later.

Fabrication of Prismatic Lithium Ion Battery
Preparation of Positive Electrode Plate 90 mass % of $LiCoO_2$ as a positive electrode active material, 5 mass % of carbon black as a conductive agent, and 5 mass % of polyvinylidene fluoride as a binder agent were mixed with an N-methyl-2-pyrrolidone (NMP) solution as a solvent to prepare a positive electrode mixture slurry. Next, the resultant positive electrode mixture slurry was applied onto both sides of an aluminum foil (thickness: 15 μm) serving as a positive electrode current collector. Then, the article was dried to remove the solvent and compressed with rollers to a thickness of 0.1 mm. Thereafter, it was cut into a sheet with the above-described width L1 and height L2, so that the positive electrode current collector tab 1b protrudes therefrom. Thus, the positive electrode plate 1 was prepared.

Preparation of Negative Electrode Plate 95 mass % of natural graphite powder as a negative electrode active material and 5 mass % of polyvinylidene fluoride as a binder agent were mixed with an NMP solution as a solvent to prepare a slurry. Thereafter, the resultant slurry was applied onto both sides of a copper foil (thickness: 10 μm) serving as a negative electrode current collector. Thereafter, the article was dried to remove the solvent and compressed with rollers to a thickness of 0.08 mm. Thereafter, it was cut into a sheet with the above-mentioned width L7 and height L8, so that the negative electrode current collector tab 2b protrudes therefrom. Thus, the negative electrode plate 2 was prepared.

Preparation of Battery 51 sheets of the negative electrode plate 2 and 50 sheets of the positive electrode plate 1, each prepared in the above-described manners, were alternately stacked one upon the other with the separators 3 interposed therebetween, to prepare a stacked electrode assembly 4. It should be noted that negative electrode plates 2 were disposed at the opposite endmost portions of the stacking direction of the stacked electrode assembly 4. Next, tapes 5 for preventing misalignment were affixed on four sides of the stacked electrode assembly 4 so as to straddle over the stacked electrode assembly 4.

50 sheets of the positive electrode current collector tab 1b, which protrude from the stacked electrode assembly 4, were welded to the positive electrode current collector terminal 8 by ultrasonic welding, and 51 sheets of the negative electrode current collector tab 2b, which protrude from the stacked electrode assembly 4, were also welded to the negative electrode current collector terminal 9 by ultrasonic welding. Then, the stacked electrode assembly 4 was placed in a recessed portion of the laminate films 7. Thereafter, the laminate films 7 were welded to each other at one side of the laminate films in which the positive and negative electrode current collector terminals 8 and 9 exist, under the condition in which the positive and negative electrode current collector terminals 8 and 9 protrude from the laminate films 7. Subsequently, the laminate films 7 were welded at two sides of the remaining three sides of the laminate films 7, so that the stacked electrode assembly 4 was placed inside the laminate battery case 6.

Next, thermal welding was performed at a 5-mm wide portion inward of a side of the welded portion in which the current collector tabs exist (proof pressure: 2 $kgf/cm^2$). No inner plastic layer 7a was provided in a region (width: 2 mm, length 30 mm) outward of this welded portion so that the two aluminum foils are electrically connected to each other. Thus, the internal gas pressure sensing portion 30 was provided.

Next, in order to confirm the potentials of the aluminum layers, 1-mm square portions in which the outer plastic layer 7c is absent was provided in the two sheets of the laminate. Thus, the voltage detection holes 31a and 31b were provided.

Lastly, a non-aqueous electrolyte solution was filled into the laminate battery case 6 through the opening of the laminate battery case 6, and thereafter, the opening of the laminate battery case 6 (the remaining one side of the laminate films) was welded under the condition in which the internal pressure of the laminate battery case 6 was restricted to be 20 torr, whereby the stack type battery 40 was prepared. The above-mentioned non-aqueous electrolyte solution was prepared by dissolving $LiPF_6$ at a concentration of 1 M (mole/liter) in a mixed solvent of 30:70 volume ratio of ethylene carbonate (EC) and methyl ethyl carbonate (MEC).

Example 2

Figure 13:
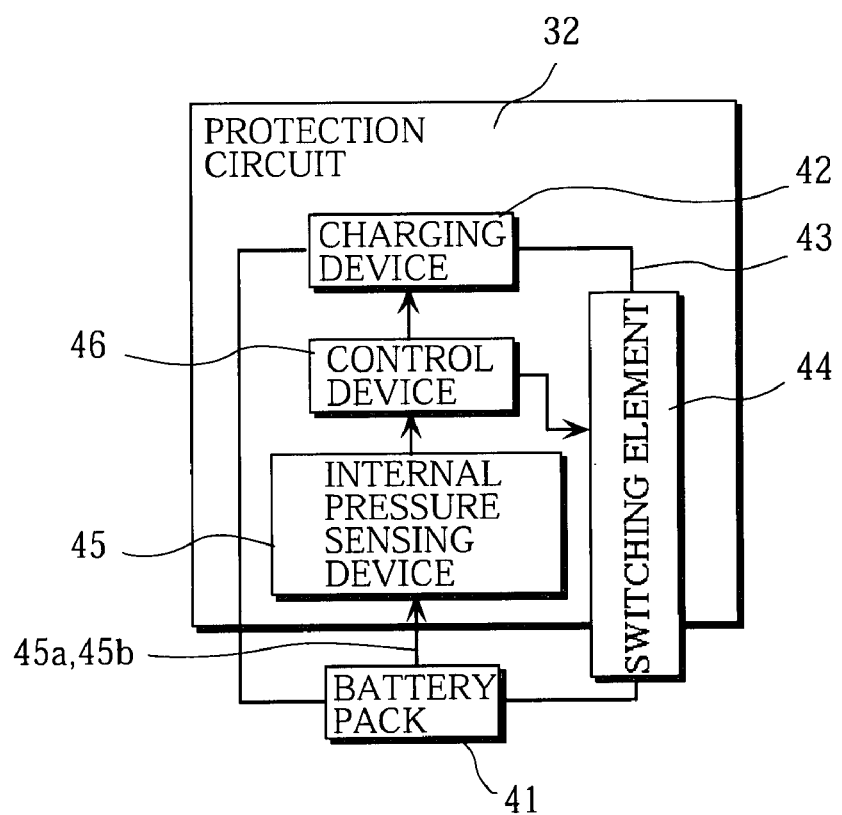
FIG. 13 is a block diagram illustrating the configuration of the protection circuit.

Next, one example of a battery module in which a protection circuit 32 is connected to a battery pack 41 comprising a plurality of stack type batteries 40 will be described with reference to FIGS. 13 to 15. The protection circuit 32 comprises, as illustrated in FIG. 13, a charging device 42 for charging the battery pack 41, a switching element 44 coupled on a charging line 43 for supplying electric power from the charging device 42 to the battery pack 41, an internal pressure sensing device 45 for detecting an internal pressure of each of the stack type batteries 40 that constitute the battery pack 41, and a control device 46. The control device 46 controls the charge operation of the charging device 42 and also controls on/off of the switching element 44. The internal pressure sensing device 45 supplies a constant current to the metal layer 7b of each of the stack type batteries 40 and monitors a change in the voltage value or the resistance value to detect an internal pressure. If the internal pressure has reached a predetermined value or higher, the internal pressure sensing device 45 notifies the control device 46 that the internal pressure has reached the predetermined value or higher, based on the detection result of the internal pressure. Thereby, the control device 46 turns off the switching element 44. As a result, charging of the battery pack 41 is stopped.

Figure 14:
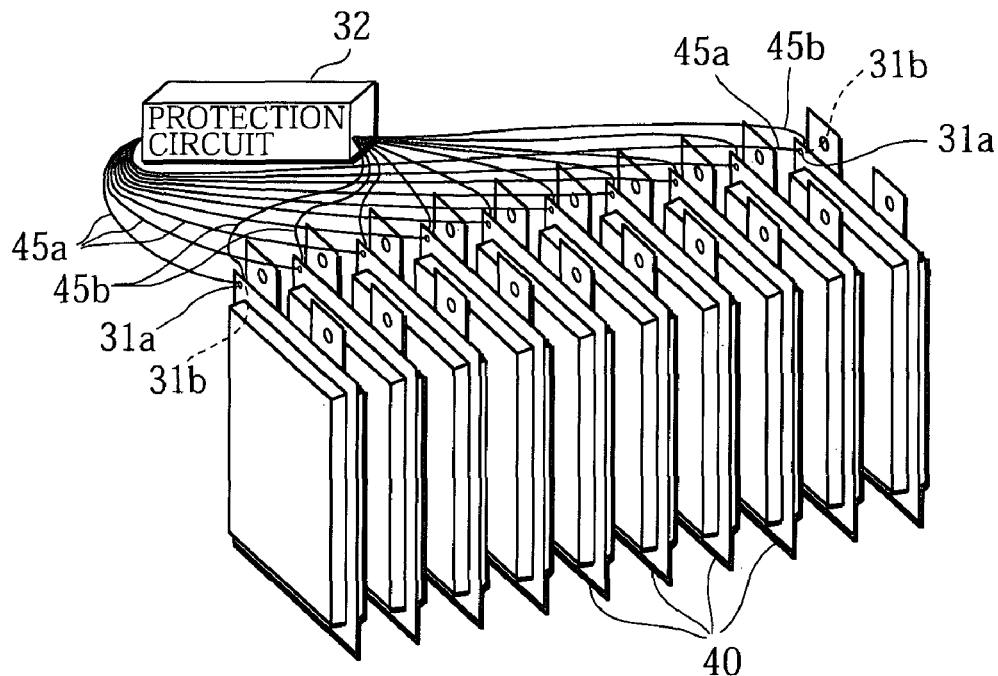
FIG. 14 is a perspective view illustrating how a battery pack and an internal pressure sensing device in the protection circuit are connected.
Figure 15:
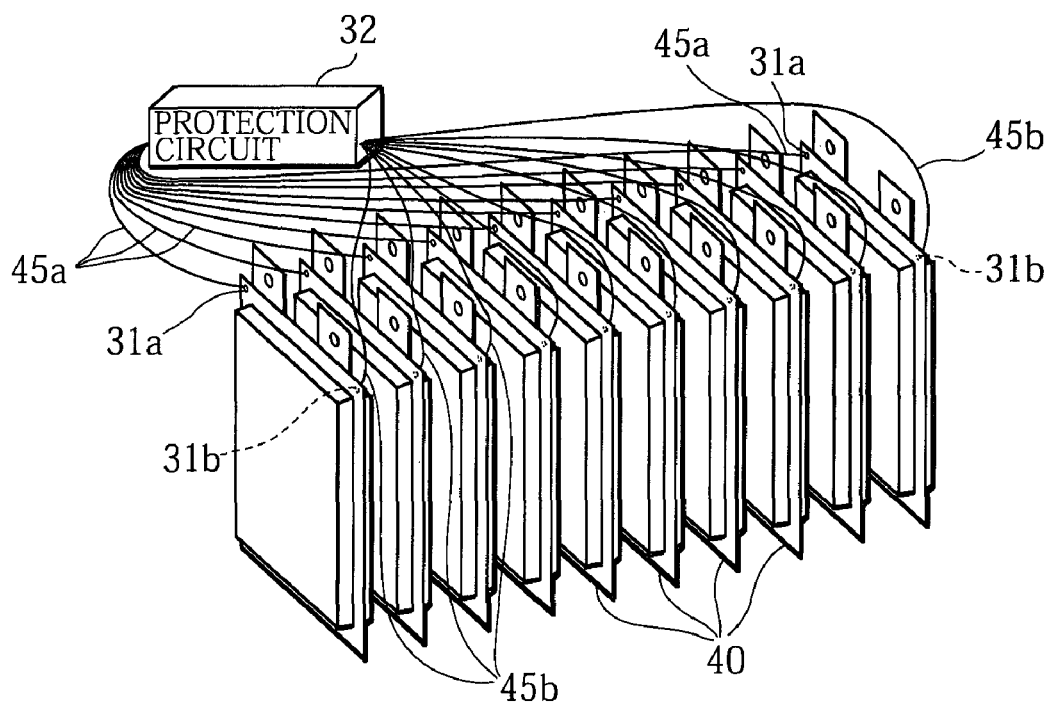
FIG. 15 is a perspective view illustrating another example of how a battery pack and an internal pressure sensing device in the protection circuit are connected.
Figure 16:
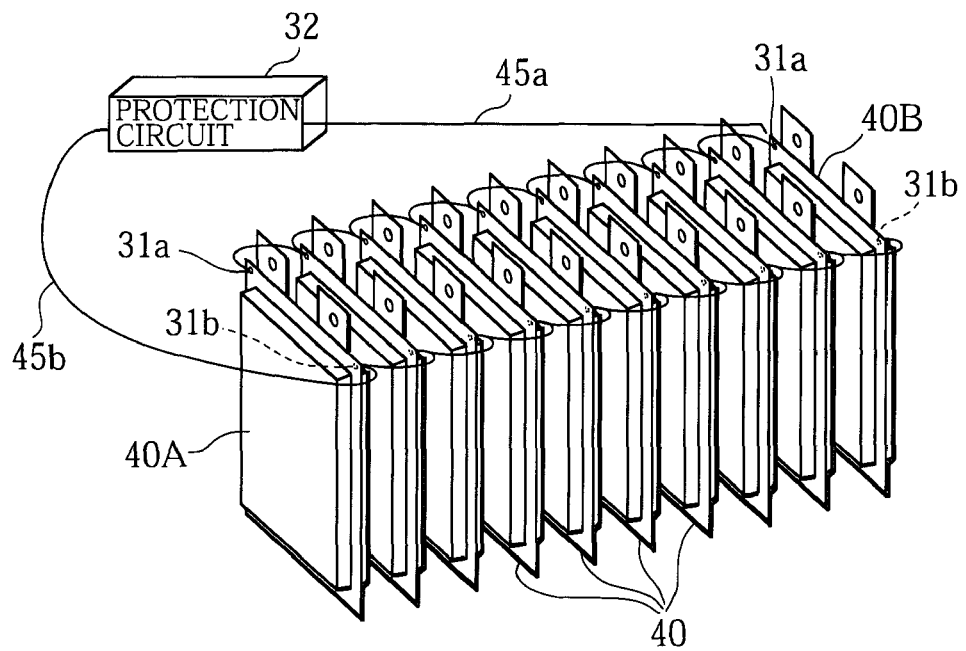
FIG. 16 is a perspective view illustrating yet another example of how a battery pack and an internal pressure sensing device in the protection circuit are connected.
Figure 17:
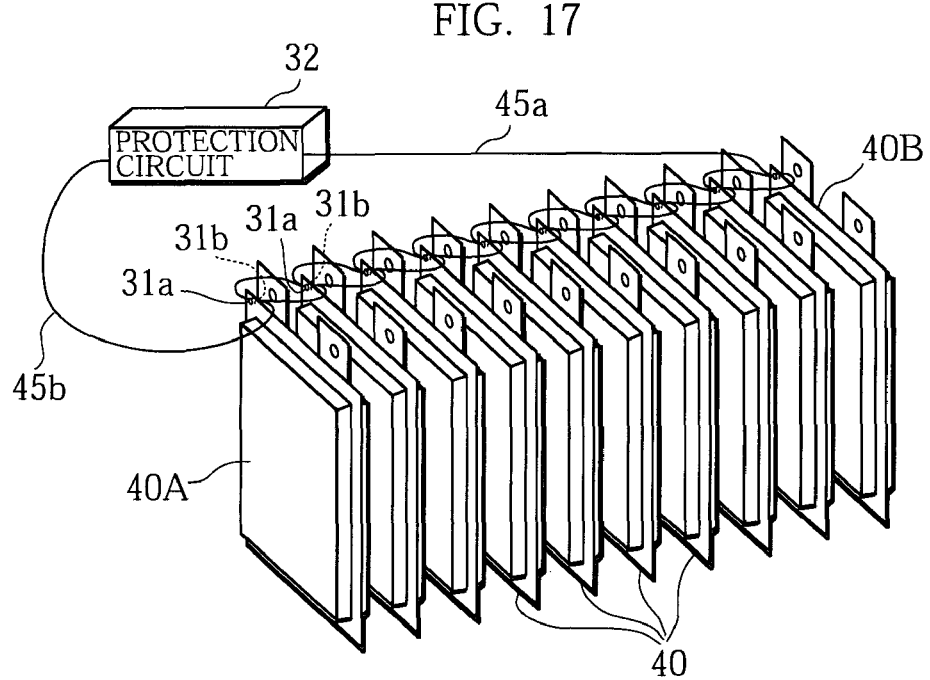
FIG. 17 is a perspective view illustrating still another example of how a battery pack and an internal pressure sensing device in the protection circuit are connected.

The method of connection between the battery pack 41 and the internal pressure sensing device 45 in the protection circuit 32 for detecting the internal pressure of the stack type battery 40 is broadly grouped into two methods: a connection method shown in FIGS. 14 and 15, and a connection method shown in FIGS. 16 and 17.

The Connection Method Shown in FIGS. 14 and 15

In the case of FIG. 14, the voltage detection holes 31a and 31b of each of the stack type batteries 40 are located at a top left corner portion of the outer welded portion 17a, at the same location in the reverse face and the obverse face. The specific connection method is as follows. The exposed portions of the metal layers 7b within the voltage detection holes 31a of the stack type batteries 40 are connected to respective connecting lines 45a, and the exposed portions of the metal layers 7b within the voltage detection holes 31b in the stack type batteries 40 may be connected to respective other connecting lines 45b, whereby each of the stack type batteries 40 is connected individually to the internal pressure sensing device 45 in the protection circuit 32.

In the case of FIG. 15, the voltage detection hole 31a of each of the stack type batteries 40 is located at a top left corner portion of the outer welded portion 17a in the obverse face, and the voltage detection hole 31b of each of the stack type batteries 40 is located at a top right corner portion of the outer welded portion 17a in the reverse face. The specific connection method is as follows. As in the case of FIG. 14, the exposed portions of the metal layers 7b within the voltage detection holes 31a of the stack type batteries 40 are connected to respective connecting lines 45a, and the exposed portions of the metal layers 7b within the voltage detection holes 31b in the stack type batteries 40 may be connected to respective other connecting lines 45b, whereby each of the stack type batteries 40 is connected individually to the internal pressure sensing device 45 in the protection circuit 32.

The connection methods shown in FIGS. 14 and 15 make it possible to detect the internal pressure of each one of the stack type batteries 40 because each of the stack type batteries 40 is connected individually to the internal pressure sensing device 45 in the protection circuit 32. Moreover, the connection method shown in FIG. 14 makes it possible to bring the connection lines together to one corner.

It should be noted that in the case of the connection method shown in FIG. 14, both the voltage detection holes 31a and 31b are located at the same location of the top left corner portion in the reverse face and the obverse face of the outer welded portion 17a, but this is merely illustrative of the present invention. It is sufficient that both the voltage detection holes 31a and 31b be located in one same side of the two opposing sides of the stack type battery 40 across the positive and negative electrode current collector terminals. In the case of the connection method shown in FIG. 15, the voltage detection hole 31a is located at a top left corner portion of the outer welded portion 17a in the obverse face, and the voltage detection hole 31b is located at a top right corner portion of the outer welded portion 17a in the reverse face, but this is merely illustrative of the present invention. It is sufficient that the voltage detection hole 31a be located in one side of the two opposing sides of the stack type battery 40 across the positive and negative electrode current collector terminals, and the voltage detection hole 31b be located in the other side of the two opposing sides of the stack type battery 40 across the positive and negative electrode current collector terminals.

The Connecting Method Shown in FIGS. 16 and 17

In the case of FIG. 16, the voltage detection hole 31a of each of the stack type batteries 40 is formed at a top left corner portion of the outer welded portion 17a in the obverse face, and the voltage detection hole 31b of each of the stack type batteries 40 is located at a top right corner portion of the outer welded portion 17a in the reverse face. The specific connection method is as follows. The exposed portions of the metal layers 7b within the voltage detection holes 31a, each of which is in one face of the respective one of the stack type batteries 40, are connected serially, and the exposed portion of the metal layer 7b within the voltage detection hole 31a in one face of a stack type battery 40B in the rearmost row is connected to one connecting line 45a. Further, the exposed portions of the metal layers 7b within the voltage detection holes 31b, each of which is in the other face of the respective one of the stack type batteries 40, are connected serially, and the exposed portion of the metal layer 7b within the voltage detection hole 31b in the one face of a stack type battery 40A in the frontmost row is connected to another connecting line 45b.

In the case of FIG. 17, the voltage detection holes 31a and 31b of each of the stack type batteries 40 are located at a top left corner portion of the outer welded portion 17a, at the same location in the reverse face and the obverse face. The specific connection method is as follows. As in the case of FIG. 16, the exposed portions of the metal layers 7b within the voltage detection holes 31a, each of which is in one face of the respective one of the stack type batteries 40, are connected serially, and the exposed portion of the metal layer 7b within the voltage detection hole 31a in one face of a stack type battery 40B in the rearmost row is connected to one connecting line 45a. Further, the exposed portions of the metal layers 7b within the voltage detection holes 31b, each of which is in the other face of the respective one of the stack type batteries 40, are connected serially, and the exposed portion of the metal layer 7b within the voltage detection hole 31b in the one face of a stack type battery 40A in the frontmost row is connected to another connecting line 45b.

The connection methods shown in FIGS. 16 and 17 make it possible to detect the internal pressure of all the stack type batteries 40 at the same time. Moreover, the connection method shown in FIG. 17 makes it possible to bring the connection lines together toward one corner.

It should be noted that in the connection method shown in FIG. 17, both the voltage detection holes 31a and 31b are located at the same location of the top left corner portion in the reverse face and the obverse face of the outer welded portion 17a, but this is merely illustrative of the present invention. It is sufficient that both the voltage detection holes 31a and 31b be located in one same side of the two opposing sides of the stack type battery 40 across the positive and negative electrode current collector terminals. In the case of the connection method shown in FIG. 16, the voltage detection hole 31a is located at a top left corner portion of the outer welded portion 17a in the obverse face, and the voltage detection hole 31b is located at a top right corner portion of the outer welded portion 17a in the reverse face, but this is merely illustrative of the present invention. It is sufficient that the voltage detection hole 31a be located in one side of the two opposing sides of the stack type battery 40 across the positive and negative electrode current collector terminals, and the voltage detection hole 31b be located in the other side of the two opposing sides of the stack type battery 40 across the positive and negative electrode current collector terminals.

Additional Embodiments (1) In the foregoing examples, the inner plastic layer 7a is made of polypropylene (PP) and the outer plastic layer 7c is made of nylon. However, both the plastic layers 7a and 7c may be made of any one of polypropylene, nylon, and polyethylene terephthalate.

(2) In the foregoing examples, 50 sheets of the positive electrode plate and 51 sheets of the negative electrode plate were used. However, this is merely illustrative and the battery configuration is not limited to such a structure.

(3) The positive electrode active material is not limited to the LiCoO$_2$, but may be other substances, such as LiNiO$_2$, LiMn$_2$O$_4$, and combinations thereof. The negative electrode active material is not limited to the natural graphite as described above, but may be other substances, such as artificial graphite.

(4) In the foregoing example, the negative electrode active material layer 2a was formed on both faces of the negative electrode conductive current collector in all the negative electrode plates 2. However, the negative electrode active material layers that are provided on the portions that do not face the positive electrode plates (specifically, the negative electrode active material layers that are present on the outer sides of the outermost negative electrode plates) may be omitted. Such a configuration allows the stacked electrode assembly 4 to have a smaller thickness, making it possible to achieve a higher capacity density of the battery.

(5) The foregoing examples employed a stacked type electrode assembly, but the electrode assembly may be a spirally wound electrode assembly compressed in a flat shape.

(6) In the foregoing embodiments, the positive electrode current collector terminal 8 and the negative electrode current collector terminal 9 protrude from the same side of the laminate battery case 6. However, it is possible to employ a configuration in which the positive electrode current collector terminal 8 protrude from one side of the laminate battery case 6 while the negative electrode current collector terminal 9 protrude from another side of the laminate battery case 6.

Only selected embodiments have been chosen to illustrate the present invention. To those skilled in the art, however, it will be apparent from the foregoing disclosure that various changes and modifications can be made herein without departing from the scope of the invention as defined in the appended claims. Furthermore, the foregoing description of the embodiments according to the present invention is provided for illustration only, and is not intended to limit the invention as defined by the appended claims and their equivalents.

What is claimed is:

1. A laminate battery comprising:
   a laminate battery case comprising two laminate films each having a metal layer and plastic layers disposed on both faces of the metal layer, the laminate battery case having a welded portion in which peripheral edges of the two laminate films are welded to each other;
   an electrode assembly enclosed in the laminate battery case and comprising positive electrode plates, negative electrode plates, separators interposed between the positive electrode plates and the negative electrode plates, and positive and negative electrode current collector terminals being respectively connected to the positive and negative electrode plates and protruding from at least one side of the laminate battery case;
   an internal gas pressure sensing portion in which an inner plastic layer of each of the laminate films is absent and the metal layers are in contact with each other to be in an electrically conductive state, the internal gas pressure sensing portion provided at a portion of the welded portion; and
   a voltage detection hole in which an outer plastic layer is absent and the metal layer is exposed, the voltage detection hole formed in each surface of the two laminate films.

2. The laminate battery according to claim 1, further comprising an outer welded portion provided between the peripheral edge and the internal gas pressure sensing portion in which the metal layers are electrically connected.

3. The laminate battery according to claim 2, wherein the outer welded portion has a proof pressure equal to or higher than that of the welded portion in which the metal layers are electrically connected.

4. The laminate battery according to claim 1, wherein the internal gas pressure sensing portion is formed in a side of the welded portion from which the positive and negative electrode current collector terminals protrude, the welded portion formed over entire peripheral edges of the laminate films.

5. The laminate battery according to claim 1, wherein the metal layer comprises aluminum; an inner plastic layer of each of the plastic layers comprises one of polypropylene, nylon, and polyethylene terephthalate; and an outer plastic layer of each of the plastic layers comprises one of polypropylene, nylon, and polyethylene terephthalate.

6. The laminate battery according to claim 1, wherein a positive electrode active material of the positive electrode plates and a negative electrode active material of the negative electrode plates comprise a material capable of intercalating and deintercalating lithium.

7. A battery module comprising:
   a laminate battery according to claim 1;
   a protection circuit, for suppressing an increase of an internal pressure of the laminate battery, comprising a charging device for charging the laminate battery, a switching element coupled on a charging line for supplying electric power from the charging device to the battery, an internal pressure sensing device for detecting the internal pressure of the laminate battery, and a control device for turning the switching element to an off state if the internal pressure reaches a predetermined value or higher based on a detection result of the internal pressure sensing device; and
   one connecting line and another connecting line for electrically connecting the internal pressure sensing device in the protection circuit and the laminate battery to each other,
   wherein the one connecting line connects the internal pressure sensing device to an exposed portion of the metal layer within the voltage detection hole in one face of the laminate battery, and the other connecting line connects the internal pressure sensing device to an exposed portion of the metal layer within the voltage detection hole in the other face of the laminate battery.

8. The battery module according to claim 7, wherein a plurality of the laminate batteries are arrayed to form a battery pack, and each of the laminate batteries is connected to the internal pressure sensing device in the protection circuit by a predetermined connection configuration.

9. The battery module according to claim 8, wherein the predetermined connection configuration is such that: the one connecting line and the another connecting line are provided for each one of the laminate batteries; the exposed portions of the metal layers within the voltage detection holes, each of which being in one face of the respective one of the laminate batteries, are connected to the one connecting lines corresponding to the laminate batteries; and the exposed portions of the metal layers within the voltage detection holes, each of which being in the other face of the respective one of the laminate batteries, are connected to the other connecting lines corresponding to the laminate batteries; whereby each of the laminate batteries is individually connected to the internal pressure sensing device in the protection circuit.

10. The battery module according to claim 9, wherein in each of the laminate batteries, both the voltage detection hole in the one face and the voltage detection hole in the other face are located in one same side of two sides opposing in the width direction of the laminate battery across the positive and negative electrode current collector terminals.

11. The battery module according to claim 9, wherein in each of the laminate batteries, the voltage detection hole in the one face is located in one side of two opposing sides of the laminate battery across the positive and negative electrode current collector terminals, and the voltage detection hole in the other face is located in the other side of the two opposing sides of the laminate battery across the positive and negative electrode current collector terminals.

12. The battery module according to claim 8, wherein the predetermined connection configuration is such that: the exposed portions of the metal layers within the voltage detection holes each of which being in one face of the respective one of the laminate batteries are connected serially; the exposed portion of the metal layer within the voltage detection hole in one face of a laminate battery in the rearmost row is connected to the one connecting line; the exposed portions of the metal layers within the voltage detection holes each of which being in the other face of the respective one of the laminate batteries are connected serially; and the exposed portion of the metal layer within the voltage detection hole in the one face of a laminate battery in the frontmost row is connected to the other connecting line.

13. The battery module according to claim 12, wherein in each of the laminate batteries, both the voltage detection hole in the one face and the voltage detection hole in the other face are located in one same side of two opposing sides of the laminate battery across the positive and negative electrode current collector terminals.

14. The battery module according to claim 12, wherein in each of the laminate batteries, the voltage detection hole in the one face is located in one side of two opposing sides of the laminate battery across the positive and negative electrode current collector terminals, and the voltage detection hole in the other face is located in the other side of the two opposing sides of the laminate battery across the positive and negative electrode current collector terminals.

* * * * *